United States Patent
Sayers et al.

(10) Patent No.: US 6,556,811 B1
(45) Date of Patent: Apr. 29, 2003

(54) TRANSCEIVER UNIT

(75) Inventors: Ian Leslie Sayers, Redwood City, CA (US); John Richard Sanford, Palo Alto, CA (US)

(73) Assignee: Cisco Technology Inc., San Jose, CA (US)

( * ) Notice: Subject to any disclaimer, the term of this patent is extended or adjusted under 35 U.S.C. 154(b) by 0 days.

(21) Appl. No.: 09/415,762

(22) Filed: Oct. 8, 1999

(51) Int. Cl.[7] .................................................. H04M 1/00
(52) U.S. Cl. ......................... 455/90; 455/117; 455/217; 361/688; 361/704; 361/309; 343/702; 343/843
(58) Field of Search .................. 455/550, 90, 117, 455/217, 15, 25, 73, 562, 575; 343/702, 843, 700, 846, 893, 872; 361/688, 704, 709, 690, 692, 702, 703

(56) References Cited

U.S. PATENT DOCUMENTS

| | | | |
|---|---|---|---|
| 4,891,651 A | * | 1/1990 | Staehlin |
| 5,065,278 A | * | 11/1991 | Schultz ........................ 361/688 |
| 5,327,152 A | * | 7/1994 | Kruger |
| 5,396,402 A | * | 3/1995 | Perugini et al. ............. 257/718 |
| 5,655,375 A | * | 8/1997 | Ju |
| 5,771,468 A | * | 6/1998 | Stein .......................... 455/403 |
| 5,831,830 A | * | 11/1998 | Mahler |
| 5,917,458 A | * | 6/1999 | Ho |
| 5,991,151 A | * | 11/1999 | Capriz |
| 6,009,938 A | * | 1/2000 | Smith |
| 6,065,530 A | * | 5/2000 | Austin et al. ................ 165/185 |

* cited by examiner

Primary Examiner—Edward F. Urban
Assistant Examiner—Khawar Iqbal
(74) Attorney, Agent, or Firm—Hamilton Brook Smith & Reynolds, P.C.

(57) ABSTRACT

An air cooled transceiver enclosure which includes multiple cooling posts about the enclosure. The transmitter and receiver antennas are planar mounted above the cooling posts and the cooling posts are selected so as not to interfere with the radiation and form part of the ground plane. The cooling posts are, in general, of a height which is less than one-quarter the wave length of the frequencies to be used. In accordance with another feature of the present invention, the transceiver base unit with cooling posts and mounted antennas has an easily attachable cover which is removably engaged to the transceiver base unit and offset from the planar antennas which lie above the base unit. In accordance with another feature of the invention, the transceiver base unit with cooling posts and mounted antennas has an easily attachable cover which is removably engaged to the transceiver base unit and offset from the planer antennas which lie above the base unit.

30 Claims, 5 Drawing Sheets

TRANSCEIVER UNIT

BACKGROUND OF THE INVENTION

The present invention relates to transceiver units and enclosures therefore that are usable in wireless systems and particularly in small cellular systems.

The increased availability of wireless systems has created a demand for small transceivers that can be located within buildings and other corporate environments which are within the range of a small corporate network that may comprise a number of cells in one or more buildings and throughout a campus of a company or other entities. Transceivers are generally large and high powered and are not suitable for wall mounting or frequent deployment throughout a company's campus. Accordingly, there is a need for improved small transceiver enclosures which can be dispersed throughout a campus.

SUMMARY OF THE INVENTION

The present invention is an air cooled transceiver enclosure which includes multiple cooling posts about the enclosure. The transmitter and receiver antennas are planer mounted above the cooling post and the cooling post are selected so as not to interfere with the radiation and form part of the ground plane. The cooling posts are, in general, of a height which is less than one-quarter the wave length of the frequencies to be used.

In accordance with another feature of the invention, the transceiver base unit with cooling posts and mounted antennas has an easily attachable cover which is removably engaged to the transceiver base unit and offset from the planer antennas which lie above the base unit.

DETAILED DESCRIPTION

Figure 1:
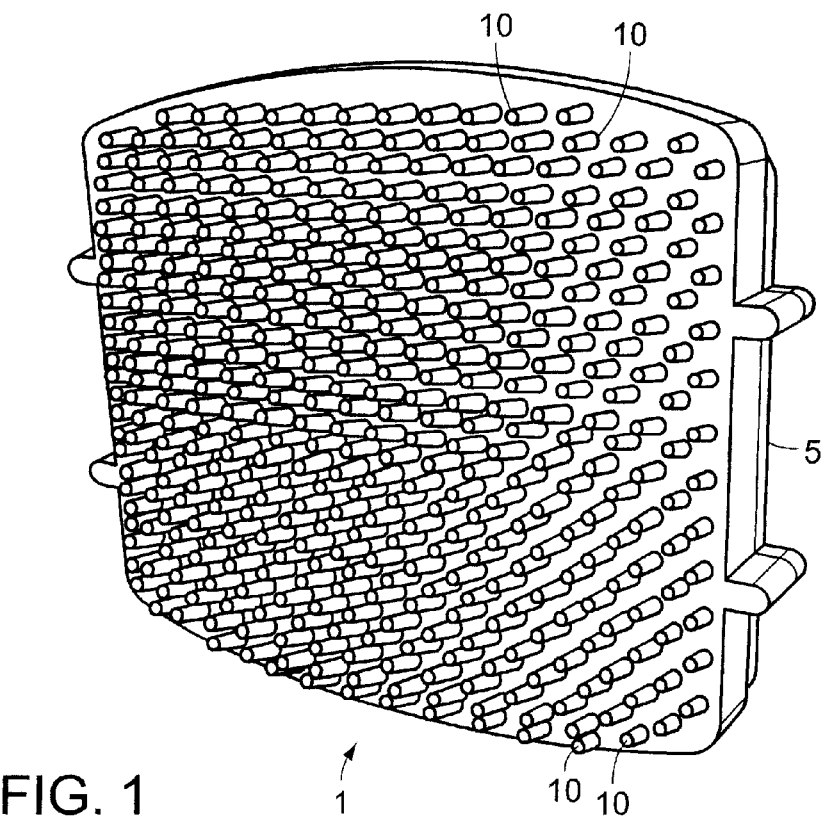
FIG. 1 is a front perspective view of the transceiver base.

In FIG. 1, the prospective view of the transceiver base unit 5 is shown facing the front 1. The front of the base 5 includes a plurality of heat-sink cones 10 which function to dissipate heat by convection when the transceiver unit 5 is suspended, for example, on a wall.

Figure 2:
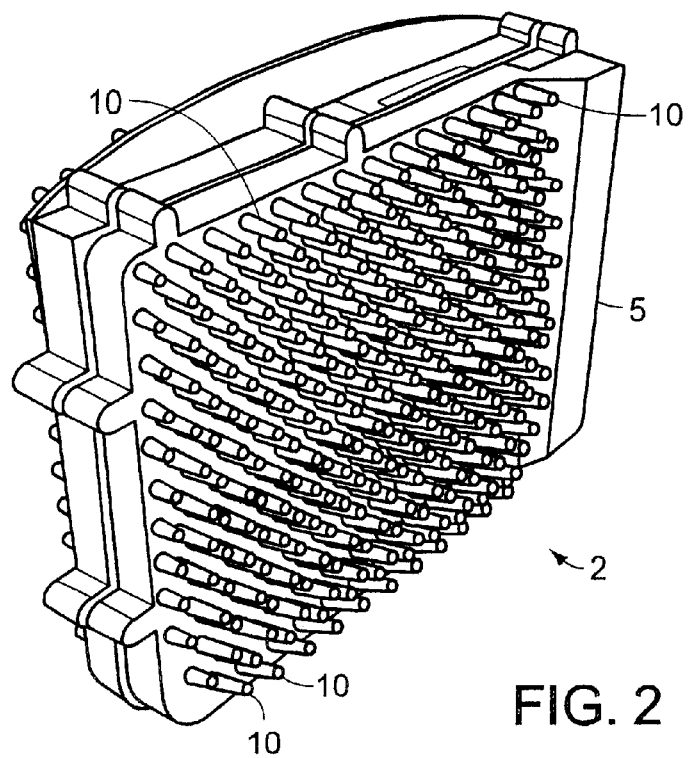
FIG. 2 is a back perspective view of the transceiver base.

In FIG. 2, the rear 2 of the transceiver unit 5 is shown, also including a plurality of heat-sink cones 10. The cones are duplicated to provide a high heat transfer surface area while allowing convection past the cones to dissipate heat into the air.

Figure 3:
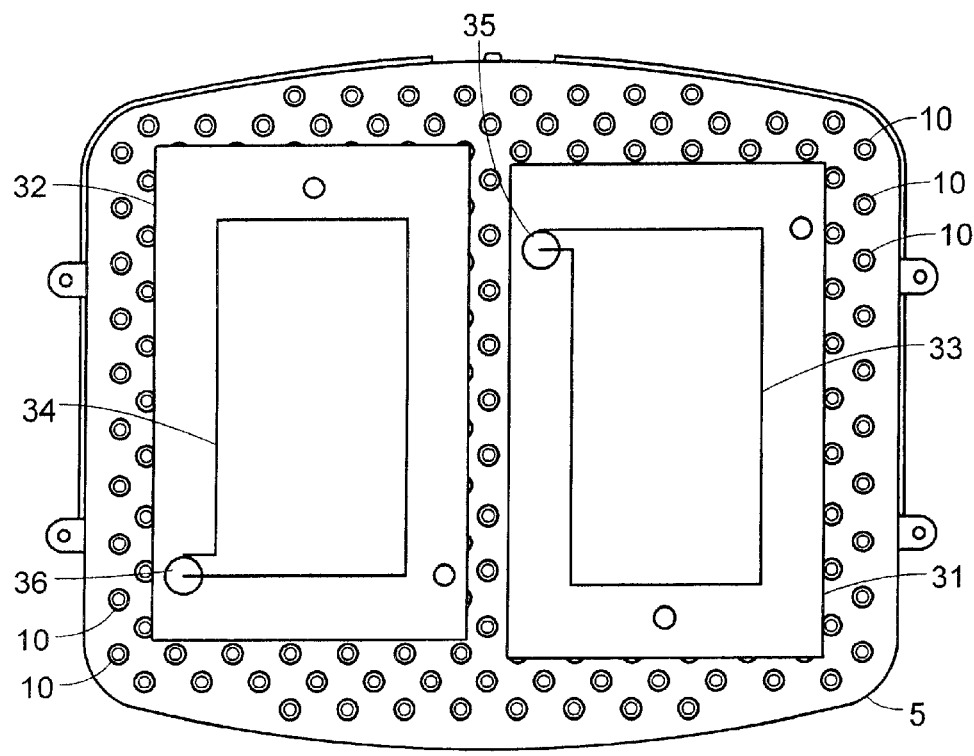
FIG. 3 is a front plan view of the transceiver base with antenna.

In FIG. 3, a front view of the transceiver unit 5 is shown with the heat-sink cones 10 and above the heat-sink cones 10 are positioned a transmitter antenna sheet 31 and a receiver antenna sheet 32. The transceiver base 5 and the cones 10 provide a ground plane for the antenna sheets 31 and 32. The transmitter antenna sheet 31 includes a plane loop antenna 33 and similarly the receive antenna sheet 32 includes a planar loop antenna 34. The loop antenna 33 connects through a coaxial connector 35 and the loop antenna 34 connects to a coaxial connector 36. The antennas connect to the electronic transceiver components internal to the base 5.

Figure 4:
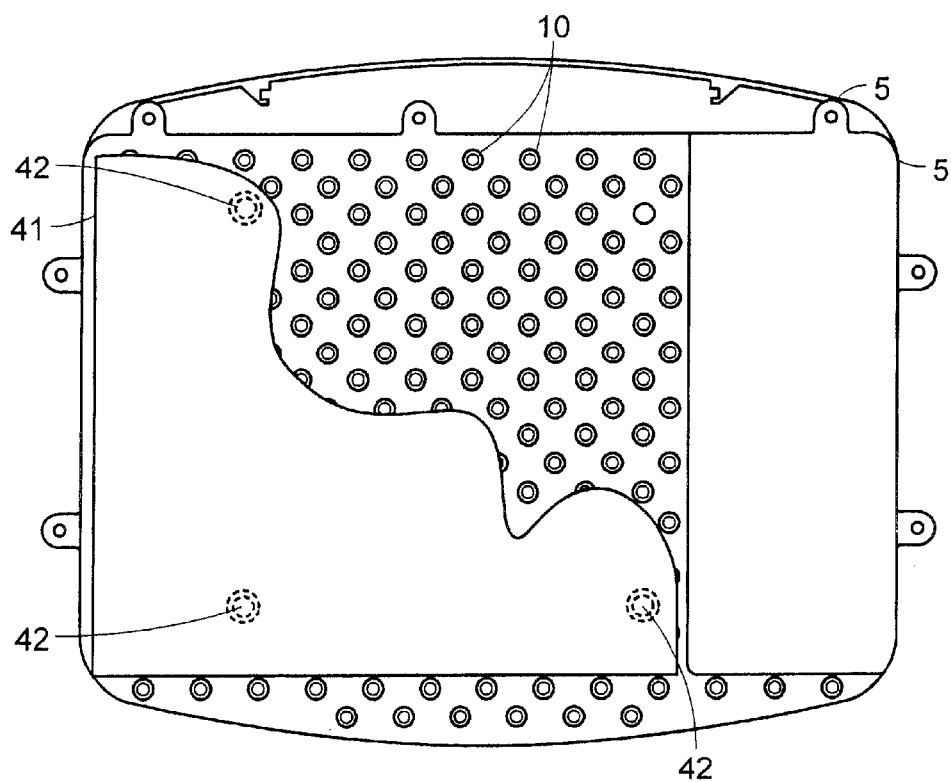
FIG. 4 is a back plan view of the transceiver base with wall mount bracket.

In FIG. 4, a rear view of the transceiver unit base 5 is shown. The rear of the unit 5 includes a mounting plate 41 which attaches to posts 42 which extend above the cooling posts 10. The plate 41 therefore allows cooling too occur by convection when the mounting plate is fastened to the wall by screws, adhesive or other convenient means (not shown).

Figure 5:
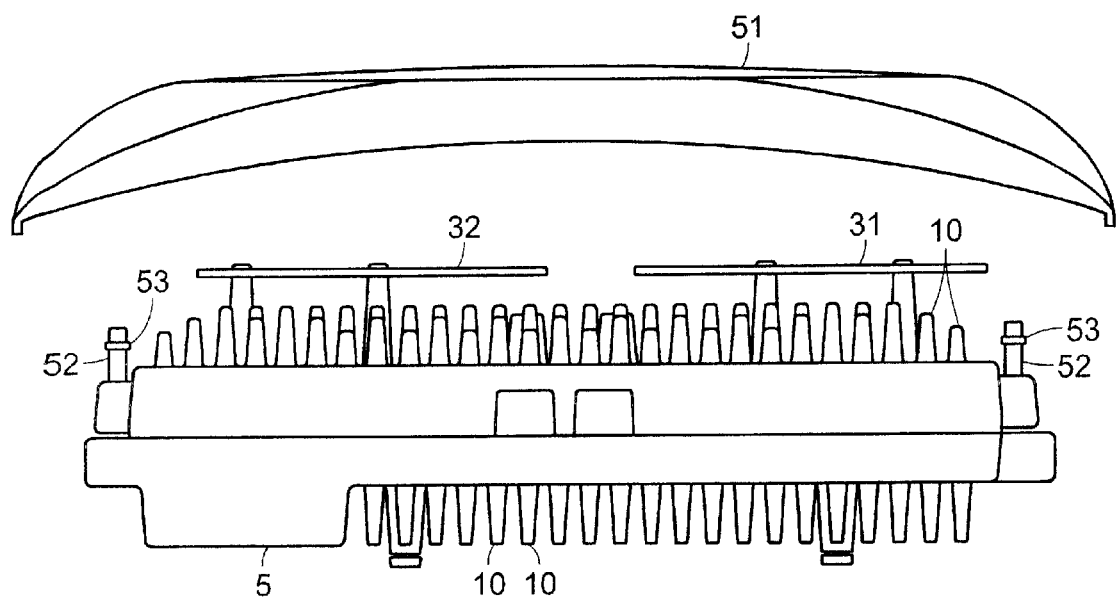
FIG. 5 is a top plan view of the transceiver base with cover lifted off.

In FIG. 5, a plastic cover 51 is shown in an exploded position above the top of the antenna sheets 31 and 32. The base 5 has a post 52 which includes a compression o-ring 53 for engaging a hole in the cover 51.

In FIG. 5, the height H of the cooling post 10 above the base of the cones 55 is less than one-quarter of a wavelength of the frequencies used by the transceiver for communication through the antennas 33 and 34. For GSM frequencies, the height is generally less than 4 centimeters, but the height can vary as a function of frequency to be employed.

Figure 6:
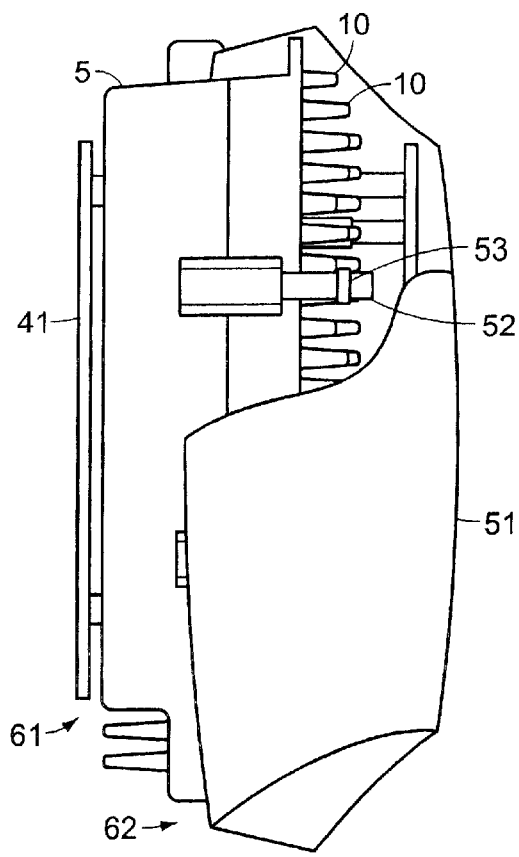
FIG. 6 is an end plan view of the transceiver base with cover on and cut away.

In FIG. 6, an end view of the FIG. 5 assembly is shown partially broken away. The cover 51 is pushed down onto the post 52 and engages the o-rings 53 in a frictional fit. There is a clearance distance around the cover 51 to allow air to enter and be convected past the post 10 in order to cool the base 5. As shown in FIG. 6, air enters both at 61 for the back cooling post and at 62 for the front cooling post.

Figure 7:
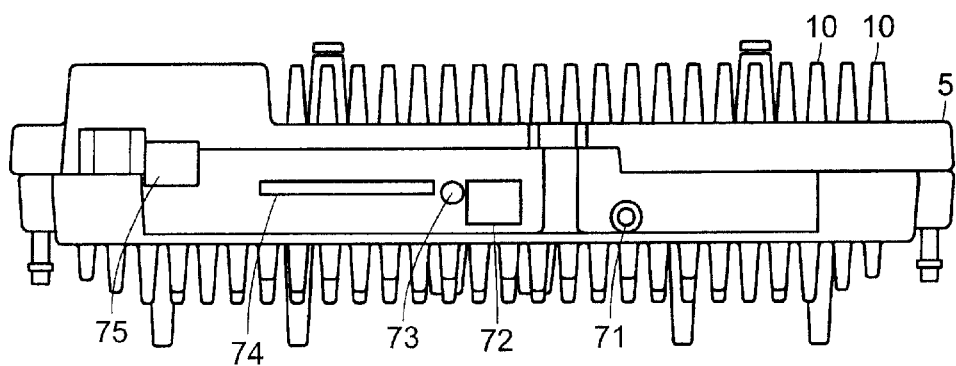
FIG. 7 is a top plan view of the transceiver base.

In FIG. 7, a top view of the receiver unit 5 is shown. The top of FIG. 7 has various openings 71, 72, 73, 74 and 75 for connectors including power, GPS antenna connections, local area network connections and other connections useful in operating a transceiver unit.

Figure 8:
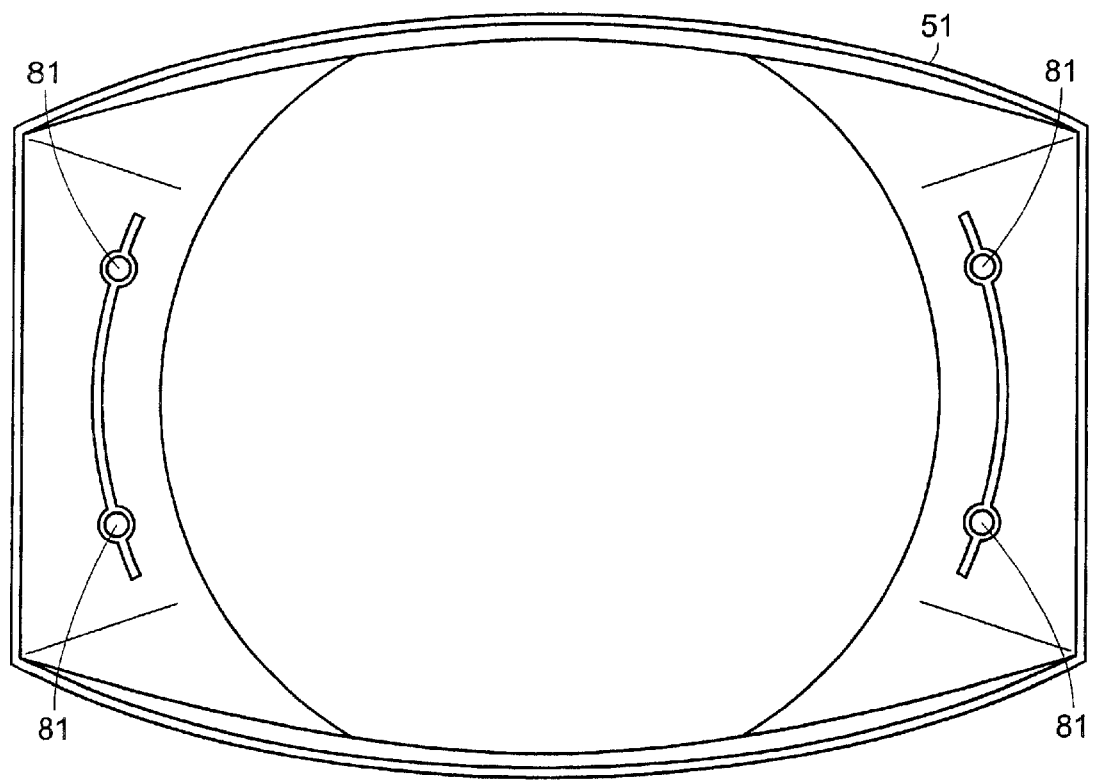
FIG. 8 is a bottom plan view of the transceiver base cover.

FIG. 8 depicts a bottom view of the cover 51, showing the four receptor holes 81 that receive the post 52 and the o-ring fits 53.

Figure 9:
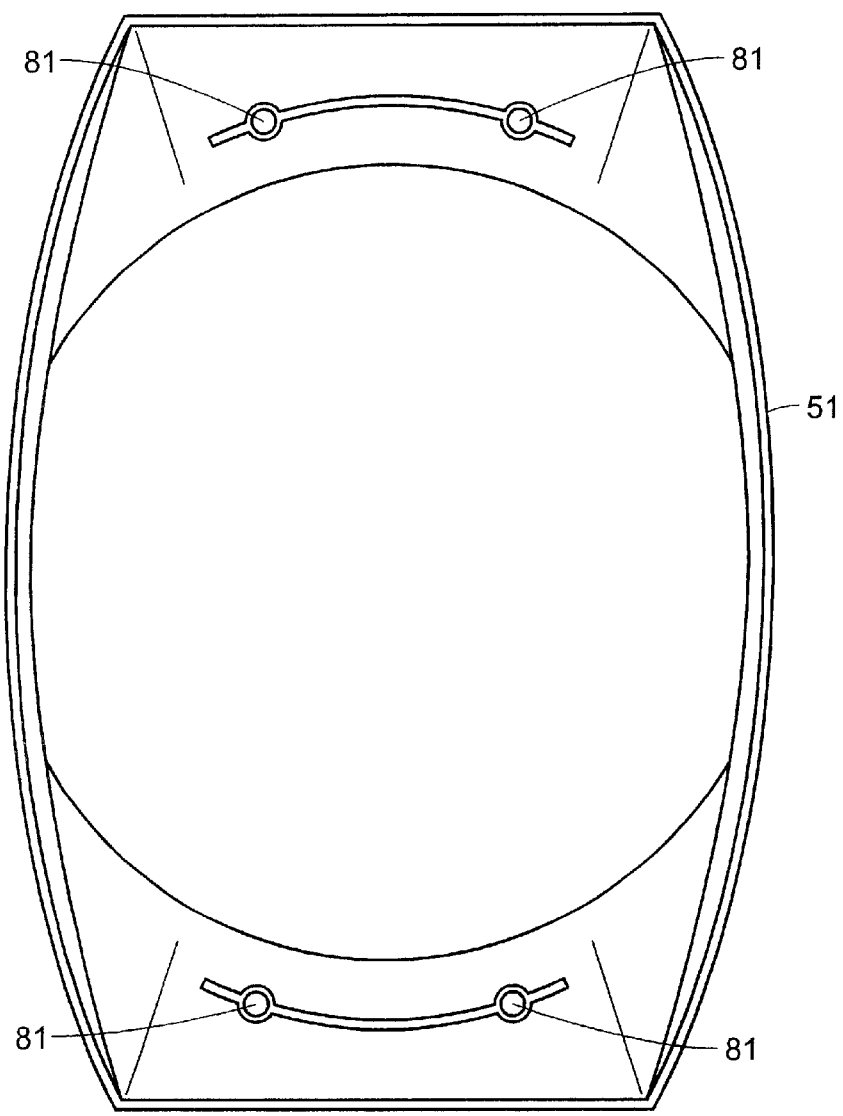
FIG. 9 is a rotated bottom plan view of the cover.

In FIG. 9, a bottom view of the cover 51 is shown again revealing the holes 81.

Figure 10:
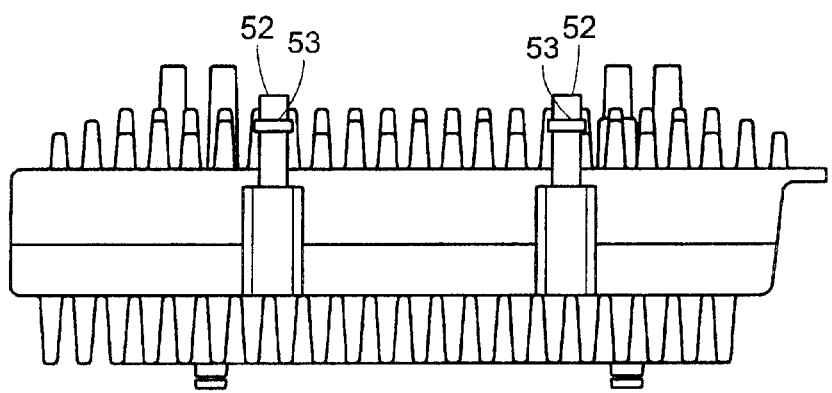
FIG. 10 is an end view of the transceiver base.

In FIG. 10, an end view of the transceiver unit 5 is shown, again showing the post and o-ring connector 52 and 53 for connecting to the holes 81 in FIG. 9.

What is claimed is:

1. A transceiver unit for transmitting and receiving radio frequencies comprising:
   a first member having a first cooling surface;
   a second member having a second cooling surface, the first and second members disposed adjacent to each other to form a transceiver base having an inner cavity;
   a plurality of air cooling posts disposed on each of the first and second cooling surfaces, said air cooling posts having a height which is less than one quarter the wave length of the frequencies employed by the transceiver unit; and
   electronic transceiver components located within the inner cavity and thermally coupled thereto, such that the electronic transceiver components dissipate heat through the plurality of air cooling posts located on both the first and the second cooling surfaces.

2. The transceiver unit of claim 1, wherein planar antennas are located above the air cooling posts on one side of the transceiver base whereby the transceiver base forms a ground plane for the antenna.

3. The transceiver unit of claim 1, wherein a cover unit is frictionally engaged above the transceiver base so as to allow air cooling to circulate by convection past the air cooling posts on the first cooling surface.

4. The transceiver unit of claim 1, additionally comprising:
rear mounting posts located on the second cooling surface for accepting a mounting plate which holds the transceiver unit away from a mounting surface such that an air gap is created between the air cooling posts on the second cooling surface and the mounting plate.

5. The transceiver unit of claim 4, wherein the first plurality of rear mounting posts are longer than the air cooling posts, thereby forming a space between the air cooling posts on the second cooling surface and the mounting plate.

6. The transceiver unit of claim 1, additionally comprising:
a first plurality of front mounting posts located on the first cooling surface for accepting planar antennas such that an air gap is created between the air cooling posts and the planar antennas.

7. The transceiver unit of claim 6, additionally comprising:
a second plurality of front mounting posts located on the first cooling surface for accepting a cover unit such that an air gap is created between the planar antennas, the transceiver base and the cover unit such that air flows over the air cooling posts.

8. The transceiver unit of claim 6, wherein the first plurality of front mounting posts are longer than the air cooling posts, thereby forming a space between the air cooling posts and the planar antennas.

9. The transceiver unit of claim 1, wherein the transceiver base protects the electronic components from outside elements.

10. The transceiver unit of claim 1, wherein the transceiver base further comprises a plurality of openings for accepting a power connector, a global positioning system (GPS) antenna connector, a local area network (LAN) connector, and other connectors useful in operating the transceiver unit.

11. A transceiver unit for transmitting and receiving radio frequencies comprising:
a first member having a first cooling surface;
a second member having a second cooling surface, the first and second members disposed adjacent to each other to form a transceiver base having an inner cavity;
a plurality of air cooling posts disposed on each of the first and second cooling surfaces, said air cooling posts having a height which is less than one quarter the wave length of the frequencies employed by the transceiver unit;
electronic transceiver components located within the inner cavity and thermally coupled thereto, such that the electronic transceiver components dissipate heat through the plurality of air cooling posts located on both the first and the second cooling surfaces; and
rear mounting posts located on the second cooling surface for accepting a mounting plate which holds the transceiver unit away from a mounting surface such that an air gap is created between the air cooling posts and the mounting plate.

12. The transceiver unit of claim 11, wherein the first plurality of rear mounting posts are longer than the air cooling posts.

13. The transceiver unit of claim 11, additionally comprising:
a first plurality of front mounting posts located on the first cooling surface for accepting planar antennas such that an air gap is created between the air cooling posts and the planar antennas.

14. The transceiver unit of claim 13, wherein the first plurality of front mounting posts are longer than the air cooling posts.

15. The transceiver unit of claim 13, additionally comprising:
a second plurality of front mounting posts located on the first cooling surface for accepting a cover unit such that an air gap is created between the planar antennas, the transceiver base and the cover unit such that air flows over the air cooling posts.

16. A method for cooling a transceiver unit which transmits and receives radio frequencies comprising:
disposing a first member and a second member adjacent to each other to form a transceiver base having an inner cavity, the first member having a first cooling surface and the second member having a second cooling surface;
disposing a plurality of air cooling posts on each of the first and second cooling surfaces, said air cooling posts having a height which is less than one quarter the wave length of the frequencies employed by the transceiver unit; and
thermally coupling electronic transceiver components within the inner cavity, such that the electronic transceiver components dissipate heat through the plurality of air cooling posts located on both the first and the second cooling surfaces.

17. The method of claim 16, wherein the transceiver base protects the electronic components from outside elements.

18. The method of claim 16, wherein the transceiver base additionally comprises connecting at least one of a power connector, a global positioning system (GPS) antenna connector, a local area network (LAN) connector, or other devices useful in operating the transceiver unit.

19. The method of claim 16, additionally comprising mounting planar antennas above the air cooling posts on one side of the transceiver base whereby the transceiver base forms a ground plane for the antenna.

20. The method of claim 16, additionally comprising frictionally engaging a cover unit above the transceiver base so as to allow air cooling to circulate by convection past the air cooling posts on the first cooling surface.

21. The method of claim 16, additionally comprising disposing rear mounting posts on the second cooling surface for accepting a mounting plate which holds the transceiver unit away from a mounting surface such that an air gap is created between the air cooling posts on the second cooling surface and the mounting plate.

22. The method of claim 21, wherein the first plurality of rear mounting posts are longer than the air cooling posts, thereby forming a space between the air cooling posts on the second cooling surface and the mounting plate.

23. The method of claim 16, additionally comprising disposing a first plurality of front mounting posts on the first cooling surface for accepting planar antennas such that an air gap is created between the air cooling posts and the planar antennas.

24. The method of claim 23, additionally comprising disposing a second plurality of front mounting posts on the first cooling surface for accepting a cover unit such that an air gap is created between the planar antennas, the transceiver base and the cover unit such that air flows over the air cooling posts.

25. The method of claim 23, wherein the first plurality of front mounting posts are longer than the air cooling posts, thereby forming a space between the air cooling posts and the planar antennas.

26. A method for cooling a transceiver unit which transmits and receives radio frequencies comprising:

disposing a first member and a second member adjacent to each other to form a transceiver base having an inner cavity, the first member having a first cooling surface and the second member having a second cooling surface;

disposing a plurality of air cooling posts on each of the first and second cooling surfaces, said air cooling posts having a height which is less than one quarter the wave length of the frequencies employed by the transceiver unit;

thermally coupling electronic transceiver components within the inner cavity, such that the electronic transceiver components dissipate heat through the plurality of air cooling posts located on both the first and the second cooling surfaces; and disposing rear mounting posts on the second cooling surface for accepting a mounting plate which holds the transceiver unit away from a mounting surface such that an air gap is created between the air cooling posts and the mounting plate.

27. The method of claim 26, wherein the first plurality of rear mounting posts are longer than the air cooling posts.

28. The method of claim 26, additionally comprising disposing a first plurality of front mounting posts on the first cooling surface for accepting planar antennas such that an air gap is created between the air cooling posts and the planar antennas.

29. The method of claim 28, wherein the first plurality of front mounting posts are longer than the air cooling posts.

30. The method of claim 28, additionally comprising disposing a second plurality of front mounting posts on the first cooling surface for accepting a cover unit such that an air gap is created between the planar antennas, the transceiver base and the cover unit such that air flows over the air cooling posts.

* * * * *